(12) United States Patent
Rhee et al.

(10) Patent No.: US 12,298,819 B2
(45) Date of Patent: May 13, 2025

(54) FOLDABLE ELECTRONIC DEVICE INCLUDING HINGE LOCKING STRUCTURE

(71) Applicant: SAMSUNG ELECTRONICS CO., LTD., Suwon-si (KR)

(72) Inventors: Minsu Rhee, Suwon-si (KR); Gun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 18/190,632

(22) Filed: Mar. 27, 2023

(65) Prior Publication Data

US 2023/0418340 A1 Dec. 28, 2023

Related U.S. Application Data

(63) Continuation of application No. PCT/KR2023/003718, filed on Mar. 21, 2023.

(30) Foreign Application Priority Data

Jun. 28, 2022 (KR) .................. 10-2022-0078823
Aug. 5, 2022 (KR) .................. 10-2022-0098134

(51) Int. Cl.
    *G06F 1/16* (2006.01)
(52) U.S. Cl.
    CPC .......... *G06F 1/1681* (2013.01); *G06F 1/1616* (2013.01); *G06F 1/1652* (2013.01); *G06F 1/1677* (2013.01)
(58) Field of Classification Search
    CPC combination set(s) only.
    See application file for complete search history.

(56) References Cited

U.S. PATENT DOCUMENTS

| 9,460,643 B2* | 10/2016 | Hirakata | H05K 5/0086 |
| 9,892,490 B2 | 2/2018 | Honda et al. | |
| 10,727,435 B2 | 7/2020 | Kim et al. | |
| 11,178,264 B2* | 11/2021 | Kim | H04M 1/0262 |

(Continued)

FOREIGN PATENT DOCUMENTS

| JP | 6367049 B2 | 7/2018 |
| JP | 7027491 B2 | 2/2022 |

(Continued)

OTHER PUBLICATIONS

International Search Report and Written Opinion dated Jun. 23, 2023 in PCT/KR2023/003718.

*Primary Examiner* — Lisa Lea-Edmonds
(74) *Attorney, Agent, or Firm* — Nixon & Vanderhye, P.C.

(57) ABSTRACT

An example electronic device may include a first housing including a first surface, a second housing including a second surface, a third housing including a third surface, a first hinge structure rotatably connecting the second housing and the first housing, a second hinge structure rotatably connecting the first housing and the third housing, a flexible display disposed on the first surface, the second surface and the third surface, a first magnet disposed in the second housing, and a hinge locking structure which, in an abnormal state of the electronic device in which a portion of the first surface is adjacent to the second surface, faces the first magnet and which includes a pin insertable into a groove formed in at least one shaft in the second hinge structure.

20 Claims, 11 Drawing Sheets

(56) References Cited

U.S. PATENT DOCUMENTS

| | | | |
|---|---|---|---|
| 11,231,747 B2* | 1/2022 | Lee | G06F 1/1681 |
| 11,425,831 B2* | 8/2022 | Kim | H05K 5/0017 |
| 11,474,646 B2 | 10/2022 | Yamazaki | |
| 11,481,174 B2 | 10/2022 | Kwon et al. | |
| 2019/0320048 A1* | 10/2019 | Yang | G06F 1/1652 |
| 2020/0352046 A1* | 11/2020 | Kim | H04M 1/0268 |
| 2020/0366770 A1* | 11/2020 | Kim | H04M 1/0264 |
| 2022/0091635 A1 | 3/2022 | Ou et al. | |
| 2022/0181222 A1 | 6/2022 | Endo | |
| 2022/0182476 A1* | 6/2022 | Cha | H04M 1/0247 |
| 2023/0269893 A1* | 8/2023 | Yun | G06F 1/1652 |
| 2023/0418340 A1* | 12/2023 | Rhee | G06F 1/1652 |

FOREIGN PATENT DOCUMENTS

| | | |
|---|---|---|
| KR | 10-0531473 | 11/2005 |
| KR | 20170122595 A | 11/2017 |
| KR | 101834793 B1 | 3/2018 |
| KR | 20200089783 A | 7/2020 |
| KR | 20200119020 A | 10/2020 |
| KR | 20200131662 A | 11/2020 |
| KR | 20210106025 A | 8/2021 |
| KR | 20210130140 A | 10/2021 |
| KR | 20210157226 A | 12/2021 |
| KR | 20220013128 A | 2/2022 |
| KR | 20220024558 A | 3/2022 |

* cited by examiner

FOLDABLE ELECTRONIC DEVICE INCLUDING HINGE LOCKING STRUCTURE

CROSS-REFERENCE TO RELATED APPLICATIONS

This application is a continuation of International Application No. PCT/KR2023/003718, designating the United States, filed on Mar. 21, 2023, in the Korean Intellectual Property Receiving Office and claiming priority to Korean Patent Application No. 10-2022-0078823, filed on Jun. 28, 2022 in the Korean Intellectual Property Office and to Korean Patent Application No. 10-2022-0098134, filed on Aug. 5, 2022 in the Korean Intellectual Property Office. The disclosures of each of these applications are incorporated by reference herein in their entireties.

BACKGROUND

Field

The disclosure relates to a foldable electronic device including a hinge locking structure.

Description of Related Art

An electronic device including a large screen display may increase user utilization. As demand for electronic devices having high portability increases, the electronic devices may be provided with a deformable display. The deformable display may be deformable in a slidable manner, foldable manner, or rollable manner.

SUMMARY

A deformable display may have structurally weak rigidity. The deformable display may be damaged during use or by use contrary to an intended usage. An electronic device described herein may provide a structure and a method for preventing damage to the deformable display.

The technical problems to be achieved in this disclosure are not limited to those described above, and other technical problems not mentioned herein will be clearly understood from the following description.

According to an example embodiment, an electronic device may include a first housing including a first surface, a second housing including a second surface, and a third housing including a third surface. The electronic device may further include a first hinge structure (including, e.g., a hinge) rotatably connecting the first housing and a side surface of the second housing facing a first side surface of the first housing. The electronic device may further include a second hinge structure (including, e.g., a hinge) rotatably connecting the first housing and a side surface of the third housing facing a second side surface of the first housing opposite to the first side surface. The electronic device may further include a flexible display disposed on the first surface, the second surface and the third surface. The electronic device may include a first magnet disposed in the second housing, and a hinge locking structure (including, e.g., a hinge lock) which, in an abnormal state of the electronic device in which a portion of the first surface is adjacent to the second surface, faces the first magnet and which includes a pin insertable into a groove formed in at least one shaft in the second hinge structure. The first hinge structure and the second hinge structure may be configured to provide an unfolded state in which the first surface, the second surface, and the third surface face the same direction or a folded state in which at least one of the first surface, the second surface, or the third surface faces different directions. The hinge locking structure may be configured such that the pin is inserted into the groove by a force of the first magnet when the electronic device is in the abnormal state, and the pin is disengaged from the groove as the electronic device changes from the abnormal state to the unfolded state.

According to an embodiment, an electronic device may include a first housing including a first surface, a second housing including a second surface, and a third housing including a third surface. The electronic device may further include a first hinge structure (including, e.g., a hinge) rotatably connecting the first housing and a side surface of the second housing facing a first side surface of the first housing. The electronic device may further include a second hinge structure (including, e.g., a hinge) rotatably connecting the first housing and a side surface of the third housing facing a second side surface of the first housing opposite to the first side surface. The electronic device may further include a flexible display disposed on the first surface, the second surface and the third surface. The electronic device may further include a first sensor disposed in the second housing and configured to obtain first data related to a posture of the second housing, and a second sensor disposed in the third housing and configured to obtain second data related to a posture of the third housing. The electronic device may include a first magnet disposed in the second housing, and a hinge locking structure (including, e.g., a hinge lock) which, in an abnormal state of the electronic device in which a portion of the first surface is adjacent to the second surface, faces the first magnet and includes a pin insertable into a groove formed in at least one shaft in the second hinge structure. The first hinge structure and the second hinge structure may be configured to provide an unfolded state in which the first surface, the second surface, and the third surface face the same direction or a folded state in which at least one of the first surface, the second surface, or the third surface face different directions. An overlapped area of the flexible display and the first hinge structure may be wider than an overlapped area of the flexible display and the second hinge structure, in the unfolded state when the flexible display is viewed from above.

According to an embodiment, a foldable electronic device including a hinge locking structure can reduce damage to a display or the electronic device due to folding that is contrary to intended usage.

The effects that can be obtained from the present disclosure are not limited to those described above, and any other effects not mentioned herein will be clearly understood from the following description.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
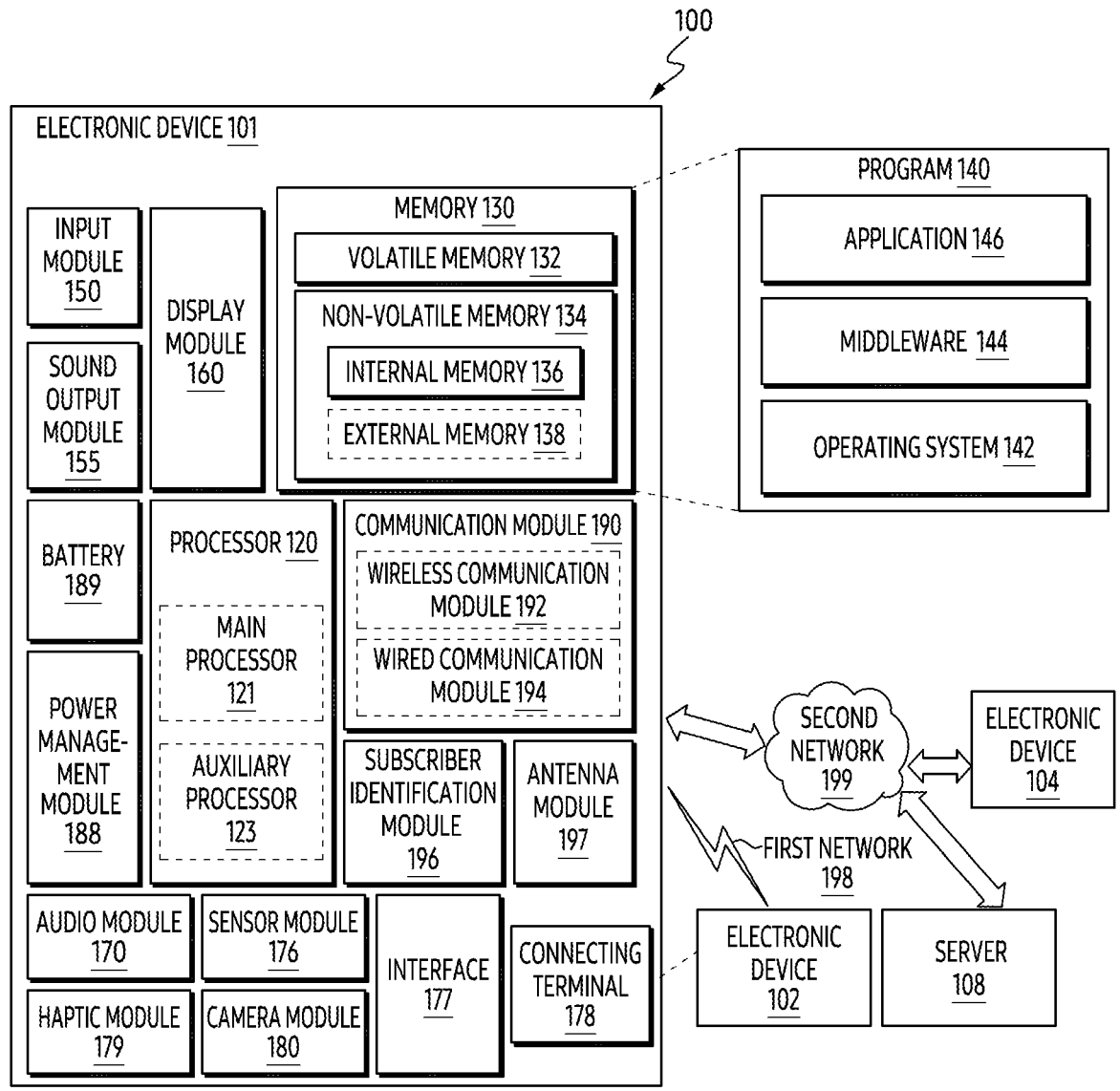
FIG. 1 is a block diagram of an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module

197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
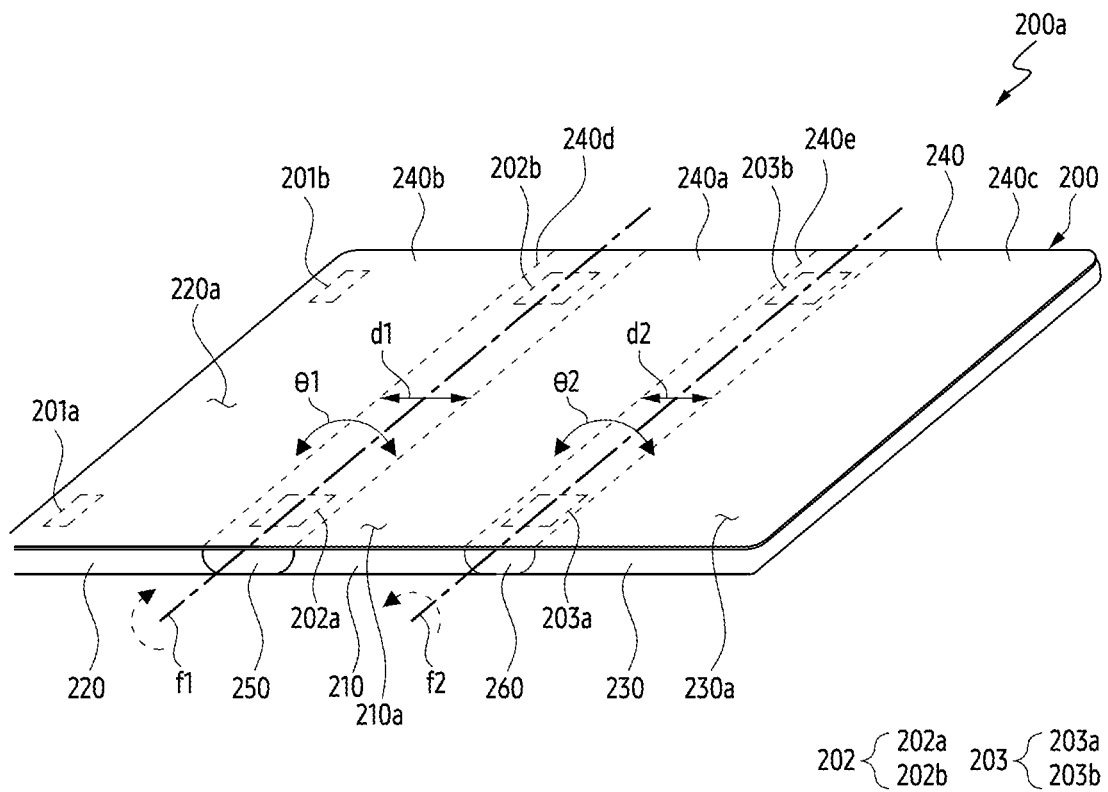
FIG. 2A illustrates an example of an unfolded state of an example electronic device according to various embodiments.
Figure 2B:
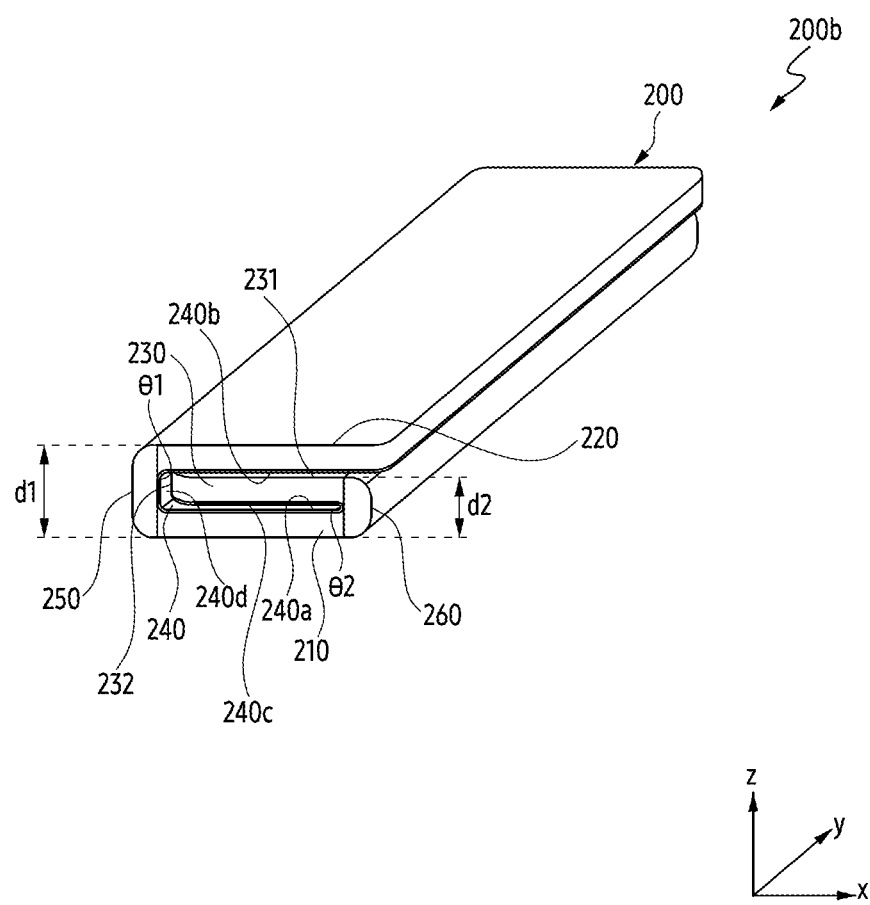
FIG. 2B illustrates an example of a fully folded state of an example electronic device according to various embodiments.

FIG. 2A illustrates an example of an unfolded state of an example electronic device according to various embodiments. FIG. 2B illustrates an example of a fully folded state of an example electronic device according to various embodiments.

A display (e.g., the display module 160 of FIG. 1) of an electronic device (e.g., the electronic device 101 of FIG. 1) may be folded at least once. The display may be referred to, for example, as a foldable display or a flexible display in terms of having a foldable structure. The electronic device may be referred to, for example, as a foldable electronic device or a flexible electronic device in terms of including a foldable display.

Referring to FIG. 2A, an electronic device 200 may be unfolded in a first state 200a. The electronic device 200 may include a first housing 210, a second housing 220, and a third housing 230. The first housing 210 may include a first surface 210a. The second housing 220 may include a second surface 220a. The third housing 230 may include a third surface 230a. The first state 200a may be a state in which the first surface 210a, the second surface 220a, and the third surface 230a face substantially the same first direction (e.g., the z-axis direction). The first state 200a may be referred to, for example, as an unfolded state in which the first housing 210, the second housing 220, and the third housing 230 are unfolded. In the first state 200a, the first housing 210, the second housing 220, and the third housing 230 may be substantially planar. For example, since the first housing 210, the second housing 220, and the third housing 230 include a substantially planar surface, the first surface 210a, the second surface 220a, and the third surface 230a may be planar.

The electronic device 200 may include a first hinge structure 202 (202a and 202b) and a second hinge structure 203 (203a and 203b). The first hinge structure 202 may include a plurality of first hinge structures 202a and 202b. The second hinge structure 203 may include a plurality of second hinge structures 203a and 203b. The first hinge structures 202a and 202b may be disposed between the first housing 210 and the second housing 220. The first hinge structures 202a and 202b may rotatably connect the second housing 220 to the first housing 210. For example, the second housing 220 may rotate with respect to the first housing 210 based on a first folding shaft f1, through the first hinge structures 202a and 202b. A first angle θ1 between the first housing 210 and the second housing 220 may be approximately 0 degrees to 180 degrees, through the rotation of the second housing 220. The second hinge structures 203a and 203b may be disposed between the first housing 210 and the third housing 230. The second hinge structures 203a and 203b may rotatably connect the third housing 230 to the first housing 210. For example, the third housing 230 may rotate with respect to the first housing 210 based on a second folding shaft f2, through the second hinge structures 203a and 203b. The second angle θ2 between the first housing 210 and the third housing 230 may be approximately 0 degrees to 180 degrees, through the rotation of the third housing 230.

The first hinge structures 202a and 202b may be surrounded by the first hinge cover 250. One (e.g., 202a) of the first hinge structures 202a and 202b may be disposed at one end of the first hinge cover 250, and another (e.g., 202b) may be disposed at another end of the first hinge cover 250. The second hinge structures 203a and 203b may be surrounded by a second hinge cover 260. One (e.g., 203a) of the second hinge structures 203a and 203b may be disposed at one end of the second hinge cover 260, and another (e.g., 203b) may be disposed at another end of the second hinge cover 260.

The electronic device 200 may further include a flexible display 240. The flexible display 240 may be disposed on one surface formed by the first housing 210, the second housing 220, and the third housing 230. The flexible display 240 may be disposed on the first surface 210a, the second surface 220a, and the third surface 230a. The flexible display 240 may include a first display area 240a, a second display area 240b, and a third display area 240c. The first display area 240a may be disposed on the first surface 210a of the first housing 210. The first display area 240a may be an area coupled to the first surface 210a and not deformed. The second display area 240b may be disposed on the second surface 220a of the second housing 220. The second display area 240b may be an area coupled to the second surface 220a and not deformed. The third display area 240c may be disposed on the third surface 230a of the third housing 230. The third display area 240c may be an area coupled to the third surface 230a and not deformed. The first display area 240a, the second display area 240b, and the third display area 240c may be referred to, for example, as planar areas, in terms of forming substantially planar surface.

The flexible display 240 may further include a fourth display area 240d and a fifth display area 240e. The fourth display area 240d may be disposed on the first hinge cover 250. The fourth display area 240d may be coupled to the first hinge cover 250 or the first hinge structures 202a and 202b. For example, the fourth display area 240d may be supported by a hinge plate (not illustrated) included in the first hinge structures 202a and 202b. The fourth display area 240d may be deformed as the second housing 220 rotates based on the first folding shaft f1 with respect to the first housing 210.

The fifth display area 240e may be disposed on the second hinge cover 260. The fifth display area 240e may be coupled to the second hinge cover 260 or the second hinge structures 203a and 203b. For example, the fifth display area 240e may be supported by a hinge plate (not illustrated) included in the second hinge structures 203a and 203b. The fifth display area 240e may be deformed as the third housing 230 rotates based on the second folding shaft f2 with respect to the first housing 210.

The fourth display area 240d may be larger than the fifth display area 240e. For example, a first distance d1, which is the width of the fourth display area 240d, may be longer (greater) than a second distance d2, which is the width of the fifth display area 240e. When the electronic device 200 is converted into the folded state, the radius of curvature of the fourth display area 240d may be greater than the radius of curvature of the fifth display area 240e.

The electronic device 200 may further include first magnets 201a and 201b. The first magnets 210a and 210b may be disposed in the second housing 220. For example, the first magnets 210a may be disposed on the side surface of the second housing 220. The first magnets 210a may be disposed closer to another side surface facing the one side surface than the one side surface of the second housing 220 facing the first hinge cover 250. The first magnets 210a may at least partially overlap an inactive area disposed along the periphery of the second display area 240b when the flexible display 240 is viewed from above. The first magnets 201a and 201b may be disposed to face the second hinge structures 203a and 203b, when the second housing 220 is folded by rotating along the first folding shaft f1.

Referring to FIG. 2B, the electronic device 200 may be folded in a second state 200b. In the second state 200b, at least one of the first surface 210a, the second surface 220a, or the third surface 230a may face different directions. The third display area 240c corresponding to the third surface 230a may face substantially the same direction as the direction in which the second display area 240b corresponding to the second surface 220a is directed (e.g., the −z axis direction). The third display area 240c may face a direction distinct from a direction in which the first display area 240a corresponding to the first surface 210a is directed. For example, a direction in which the third display area 240c is directed (e.g., the −z axis direction) may be opposite to a direction in which the first display area 240a is directed (e.g., the +z axis direction). The third display area 240c may face the first display area 240a. Since the first housing 210, the second housing 220, and the third housing 230 are folded, the second state 200b may be referred to, for example, as a folded state. In the second state 200b, the first housing 210, the second housing 220, and the third housing 230 may face each other. For example, in the second state 200b, the first housing 210, the third housing 230, and the second housing 220 may be stacked in the first direction (e.g., the z axis direction).

While changing from the first state 200a to the second state 200b, the second housing 220 may rotate with respect to the first housing 210 based on the first folding shaft f1, through the first hinge structure 202. In the second state 200b, the second housing 220 may face the third housing 230. For example, in the second state 200b, the second display area 240b disposed on the second housing 220 may face a rear surface 231 of the third housing 230.

Through the second hinge structure 203, the third housing 230 may rotate with respect to the first housing 210 based on the second folding shaft f2. In the second state 200b, the third housing 230 may face the first housing 210. For example, in the second state 200b, the third display area 240c disposed on the third housing 230 may face the first display area 240a disposed on the first housing 210. The side surface 232 of the third housing 230 may face the fourth display area 240d.

In the second state 200b, the overlapped area of the flexible display 240 and the first hinge structure 202 when the first hinge cover 250 is viewed from above may be wider than the overlapped area of the flexible display 240 and the second hinge structure 203 when the second hinge cover 260 is viewed from above. The first distance d1, which is the width of the first hinge cover 250 corresponding to the fourth display area 240d, may be longer (greater) than the second distance d2, which is the width of the second hinge cover 260 corresponding to the fifth display area 240e (e.g., the fifth display area 240e of FIG. 2A). The difference between the first distance d1 and the second distance d2 may correspond to the thickness of the second housing 220.

Based on the difference between the first distance d1 and the second distance d2, a preferentially foldable housing may be determined among the second housing 220 and the third housing 230. For example, the third housing 230 may preferentially rotate with respect to the first housing 210 based on the second folding shaft f2. After the third housing 230 is folded, the second housing 220 may rotate with respect to the first housing 210 based on the first folding shaft f1. Since the width of the second hinge structure 203 is narrower than the width of the first hinge structure 202, the third housing 230 may be folded to face the first housing 210. For example, since the width of the first hinge cover 250 is wider than that of the second hinge cover 260, the third housing 230 may be folded to face the first housing 210 based on the operation of the second hinge structure 203 in the second hinge cover 260. Since the width of the first hinge structure 202 is wider than the width of the second hinge structure 203, the second housing 220 may be folded to face the rear surface 231 of the third housing 230. For example, since the width of the first hinge cover 250 is wider than the width of the second hinge cover 260, the second housing 230 may be folded to face the rear surface 231 of the third housing 230 based on the operation of the first hinge structure 202 in the first hinge cover 250.

According to the above-described embodiment, the electronic device 200 may provide the flexible display 240 that may be folded at least once by including a plurality of hinge structures 202 and 203. The flexible display 240 may be folded several times, through the different width of hinge structures 202 and 203.

Figure 3A:
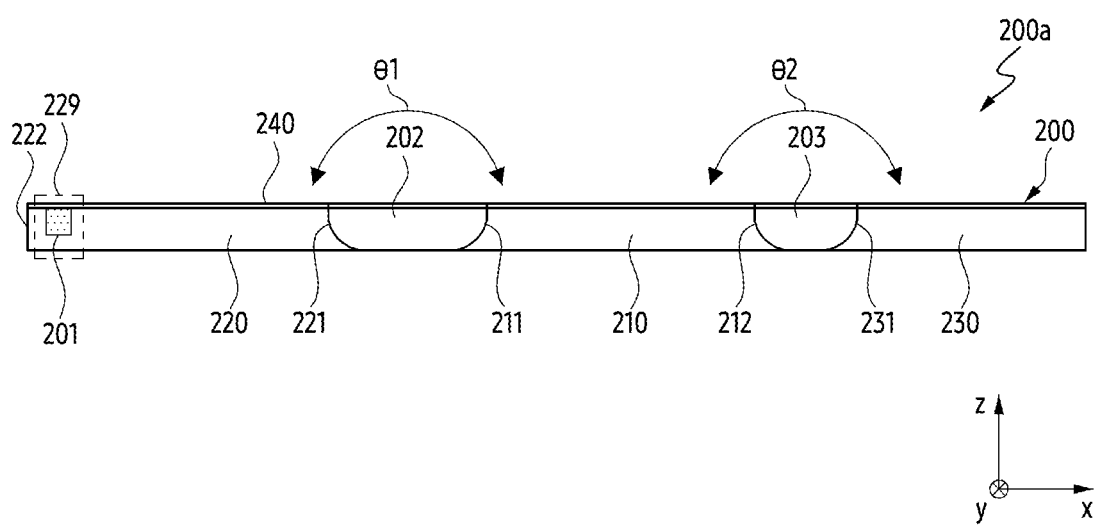
FIG. 3A illustrates an example of arrangement of a hinge locking structure in an unfolded state of an example electronic device according to various embodiments.
Figure 3B:
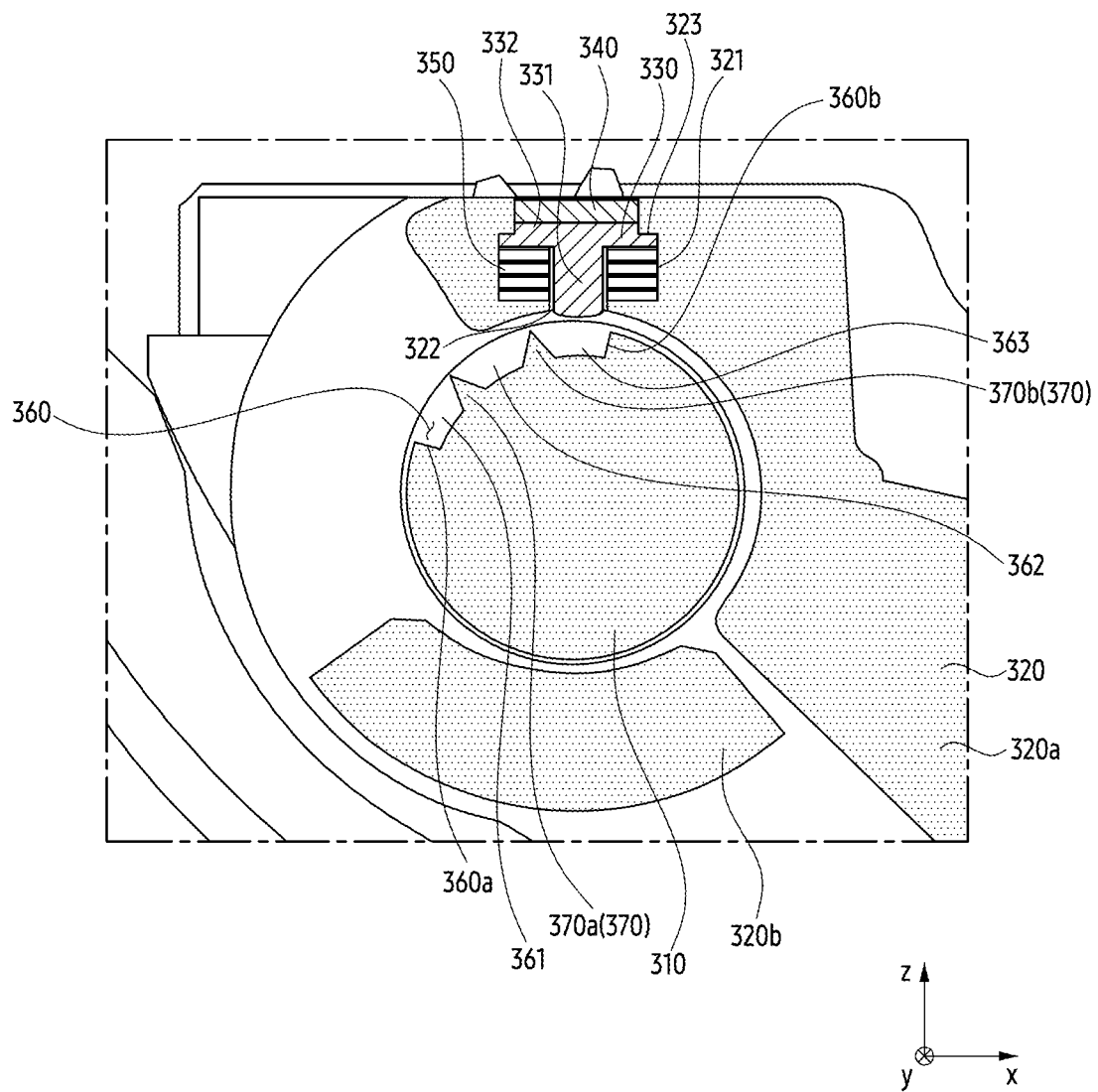
FIG. 3B illustrates an example hinge locking structure in an unfolded state of an example electronic device according to various embodiments.

FIG. 3A illustrates an example of arrangement of a hinge locking structure in an unfolded state of an example electronic device according to various embodiments. FIG. 3B illustrates an example hinge locking structure in an unfolded state of an example electronic device according to various embodiments.

Referring to FIG. 3A, the electronic device 200 may be unfolded in the first state 200a. The flexible display 240 may be disposed on a planar surface formed by the first housing 210, the second housing 220, and the third housing 230.

The first hinge structure 202 may rotatably connect one side surface 221 of the second housing 220 facing the first side surface 211 of the first housing 210 to the first housing 210. The first angle θ1 between the first housing 210 and the second housing 220 may be approximately 0 degrees to 180 degrees, through the rotation of the second housing 220. The second hinge structure 203 may rotatably connect one side surface 231 of the third housing 230 facing the second side surface 212 opposite to the first side surface 211 to the first housing 210. The second angle θ2 between the first housing 210 and the third housing 230 may be approximately 0 degree to 180 degrees, through rotation of the third housing 230.

The first magnet 201 may be disposed in the second housing 220. The first magnet 201 may be disposed on a periphery portion 229 of the second housing 220 including another side surface 222 of the second housing 220 facing one side surface 221 of the second housing 220.

A hinge locking structure 330 may be disposed in the second hinge structure 203. According to an embodiment, the second hinge structure 203 may include the hinge locking structure 330. The second hinge structure 203 may further include a physical structure for the hinge locking structure 330.

Referring to FIG. 3B, the second hinge structure 203 may include at least one shaft 310 and a shaft holder 320. For example, the second hinge structure 203 may rotate the third housing 230 with respect to the first housing 210 based on the second folding shaft f2.

The at least one shaft 310 may rotate through a change in a folded state or an unfolded state of the electronic device 200. The shaft holder 320 may rotatably support at least one shaft 310. The at least one shaft 310 may rotate a gear (not illustrated). The shafts in the second hinge structure 203 may be interlocked by the gear.

The shaft holder 320 may include a first holder 320a supporting the side surface of the shaft 310 and a second holder 320b supporting the lower part of the shaft 310. The shaft holder 320 may include a space 321 for the hinge locking structure 330. The space 321 may guide the movement of the hinge locking structure 330. For example, the hinge locking structure 330 in the space 321 may move toward the shaft 310. The hinge locking structure 330 may move to the outside of the shaft holder 320 through an opening 322 facing the shaft 310. A stopper 323 of the shaft holder 320 may limit movement of the hinge locking structure 330 in the first direction (e.g., the z axis direction) opposite to the second direction (e.g., the −z axis direction) toward which the opening 322 is directed. For example, the seating space 321 may include the stopper 323 formed on an inner surface. The stopper 323 may include a stepped portion of the inner surface of the seating space 321. As the hinge locking structure 330 moves in the first direction (e.g., the z axis direction), the hinge locking structure 330 may contact the stopper 323. As the hinge locking structure 330 contacts the stopper 323, movement in the first direction (e.g., the z axis direction) may be limited.

The hinge locking structure 330 may include a pin 331 and a head 332. The pin 331 may be movable from the inside of the seating space 321 to the outside through the opening 322. The pin 331 may be formed in a cylindrical shape, but is not limited thereto. The pin 331 may have various cross-sections and may have a length in the first direction (e.g., the z axis direction) or the second direction (e.g., the −z axis direction). The head 332 may be in contact with one end of the pin 331. For example, the head 332 may be in contact with one end of the pin 331 facing the first direction (e.g., the z axis direction). For example, the head 332 may be in contact with one end facing the flexible display 240. For example, the pin 331 may be extended from one surface of the head 332 in the second direction (e.g., the −z axis direction).

The hinge locking structure 330 may be in contact with the second magnet 340. The second magnet 340 may be attached to a portion of the hinge locking structure 330. The second magnet 340 may be disposed on one surface of the head 332 of the hinge locking structure 330. The second magnet 340 may face the flexible display 240. The second magnet 340 may interact with the first magnet 201. For example, in the first state 200a and the second state 200b, the distance between the first magnet 201 and the second magnet 340 may be far. Within a designated distance, the first magnet 201 and the second magnet 340 may move the hinge locking structure 330 in the second direction (e.g., the −z axis direction) due to the repulsive force. For example, within the abnormal state of FIGS. 4A and 4B to be described later, the distance between the first magnet 201 and the second magnet 340 may be within a designated distance. Through the repulsive force of the first magnet 201 and the second magnet 340 disposed within the designated distance, the hinge locking structure 330 may move in the second direction (e.g., the −z axis direction).

The electronic device 200 may further include an elastic member 350. The elastic member 350 may be disposed between the head 332 and the opening 322. The elastic member 350 may be in contact with the head 332. The elastic member 350 may be in contact with the inner surface of the seating space 321 in which the opening 322 is formed.

The elastic member 350 may elastically support the hinge locking structure 330 in the seating space 321. The elastic member 350 may be disposed within the seating space 321 to surround the pin 331 of the hinge locking structure 330. For example, the elastic member 350 may surround the outer circumferential surface of the pin 331. For example, the elastic member 350 may be a spring. However, the elastic member 350 is not limited thereto, and may include a rubber or porous material. For example, the elastic member 350 may be compressed by an external force. The elastic member 350 may be restored when the external force is removed.

The elastic member 350 may be compressed by the first magnet 201 and the second magnet 340 being within the designated distance. Through the interaction of the first magnet 201 and the second magnet 340 (e.g., repulsive force), the hinge locking structure 330 coupled to the second magnet 340 may move in a direction away from the first magnet 201 (e.g., −z axis direction).

The shaft 310 may include a recessed groove 360 formed on a part of the outer circumferential surface of the shaft 310 and a protrusion 370 disposed in the groove 360. At least a part of the groove 360 may be overlapped with the hinge locking structure 330 along the outer circumferential surface of the shaft 310, when the second magnet 340 is viewed from above. For example, the hinge locking structure 330 may be disposed on the groove 360. The hinge locking structure 330 may be spaced apart from the groove 360 by an elastic force caused by the elastic member 350, or be accommodated in at least a part of the space of the groove 360 through the interaction between the first magnet 201 and the second magnet 340.

The groove 360 may include stoppers 360a, 360b that limit the rotation of the shaft 310 while at least a part of the pin 331 is inserted into the groove 360. The stoppers 360a and 360b may be sidewalls of the groove 360. For example, the stoppers 360a and 360b may be sidewalls extending substantially vertically from one surface of the groove 360. The first stopper 360a and the second stopper 360b may be disposed in the periphery of the groove 360 formed by being recessed from the outer circumferential surface of the shaft 310 toward the one surface of the groove 360. The first stopper 360a may limit clockwise rotation of the shaft 310. For example, while the pin 331 is inserted into the groove 360, the pin 331 and the first stopper 360a may be contacted through clockwise rotation of the shaft 310. The shaft 310 cannot rotate clockwise due to the contact between the pin 331 and the first stopper 360a. The second stopper 360b may limit counterclockwise rotation of the shaft 310. For example, while the pin 331 is inserted into the groove 360, the pin 331 and the second stopper 360b may be contacted through counterclockwise rotation of the shaft 310. The shaft 310 cannot rotate counterclockwise due to the contact between the pin 331 and the second stopper 360b.

The groove 360 may include a plurality of protrusions 370. The plurality of protrusions 370 may protrude toward the outer circumferential surface of the shaft 310 within the groove 360. For example, the plurality of protrusions 370 may protrude from one surface of the groove 360 in a radial direction. One surface of the groove 360 may be a surface facing the radial direction of the shaft 310. The plurality of protrusions 370 may provide a plurality of accumulating spaces 361, 362, and 363 into which the pin 331 is insertable. The plurality of protrusions 370 may be spaced apart from each other by a designated interval. When the pin 331 is a polygon, the designated interval may correspond to the width of the pin 311. For example, the designated interval may correspond to a width in a rotation direction of the shaft 310 of the pin 311. When the pin 331 is circular, the designated interval may correspond to a diameter of an end surface of the pin 331. The designated interval may be related to the size of the accommodating space 362 between the plurality of protrusions 370 or the size of the accommodating spaces 361 and 363 between one of the protrusions and the sidewall of the groove 360. The designated interval may be an interval in which the pin 311 is insertable into the accommodating spaces 361, 362, and 363. For example, the designated interval may be equal to or larger than the width or diameter of the pin 311. Although the pin 311 has been described as being polygonal or circular, it is not limited thereto. The cross-section of the pin 311 may have an oval shape, or may have a shape, which is insertable into the groove 360 or the accommodating spaces 361, 362, and 363.

The plurality of protrusions 370 may include a first protrusion 370a and a second protrusion 370b. The plurality of protrusions 370 may provide a plurality of accommodating spaces 361, 362, and 363 into which the pin 331 is insertable. For example, the first protrusion 370a and the first stopper 360a may provide a first space 361. The first space 361 may be overlapped with the pin 331 when viewed in the z axis direction, since the third housing 230 rotates with respect to the first housing 210 in the first state 200a. Since the rotation angle of the third housing 230 with respect to the first housing 210 is limited by providing the first stopper 360a, the first space 361 may prevent damage to the display in an abnormal state. The abnormal state will be described in detail below with respect to FIGS. 4A, 4B, 5A, and 5B.

The first protrusion 370a and the second protrusion 370b may provide a second space 362. The second space 362 may be overlapped with the pin 331, as the third housing 230 rotates with respect to the first housing 210 from the first state 200a. The second protrusion 370b and the second stopper 360b may provide the third space 363. The third space 363 may correspond to the position of the pin 331 in the first state 200a. The pin 331 may be accommodated in the third space 363 by an interaction between the first magnet 201 and the second magnet 340.

The plurality of protrusions 370 include the first protrusion 370a and the second protrusion 370b, and have been described as two protrusions, but this is only an example. The plurality of protrusions 370 may include one protrusion or may further include three or more protrusions, corresponding to the width of the groove 360. According to an embodiment, the groove 360 may not include a plurality of protrusions. For example, the width of the groove 360 may have a size corresponding to the diameter of the pin 331 or the width of the pin 331, and may not include protrusions. For example, in a case that the groove 360 has a width larger than the diameter of the pin 331 or the width of the pin 331, the shaft 310 may rotate between the first stopper 360a and the second stopper 360b of the groove 360.

The plurality of protrusions 370 and the side surface of the groove 360 may be parallel to the radial direction of the shaft. The side surface of the plurality of protrusions 370 may incline with respect to a radial direction of the shaft. The side surface having the inclinations of the plurality of protrusions 370 may allow a pin located in one of the spaces 361, 362, and 363 to move to another space. According to the movement of the pin 331, the plurality of protrusions 370 may provide physical or tactile notifications to the user of the electronic device 200. For example, the pin 331 of the hinge locking structure 330 may move along the side surface of the second protrusion 370b having an inclination from one (e.g., the third accommodating space 363) of the accommodating spaces 361, 362, and 363. The pin 331 may move to an accommodating space (e.g., the second accommodating space 362) next (adjacent) to the one accommodating space 363, through the movement in the z axis direction along the side surface of the second protrusion 370b.

Figure 4A:
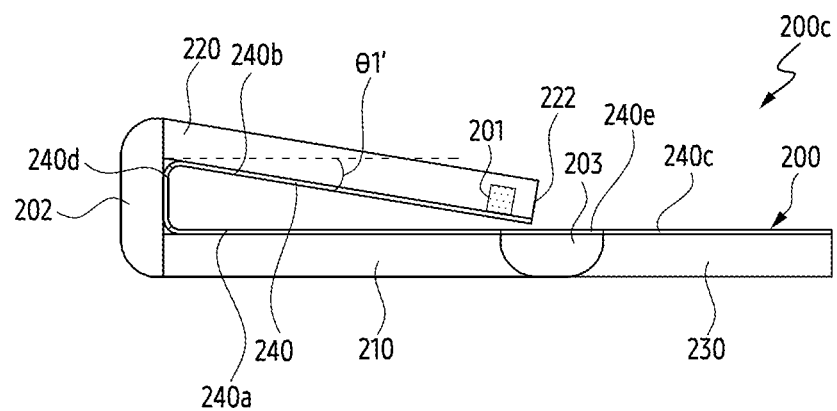
FIG. 4A illustrates an example of arrangement of a hinge locking structure in a third state of an example electronic device according to various embodiments.
Figure 4B:
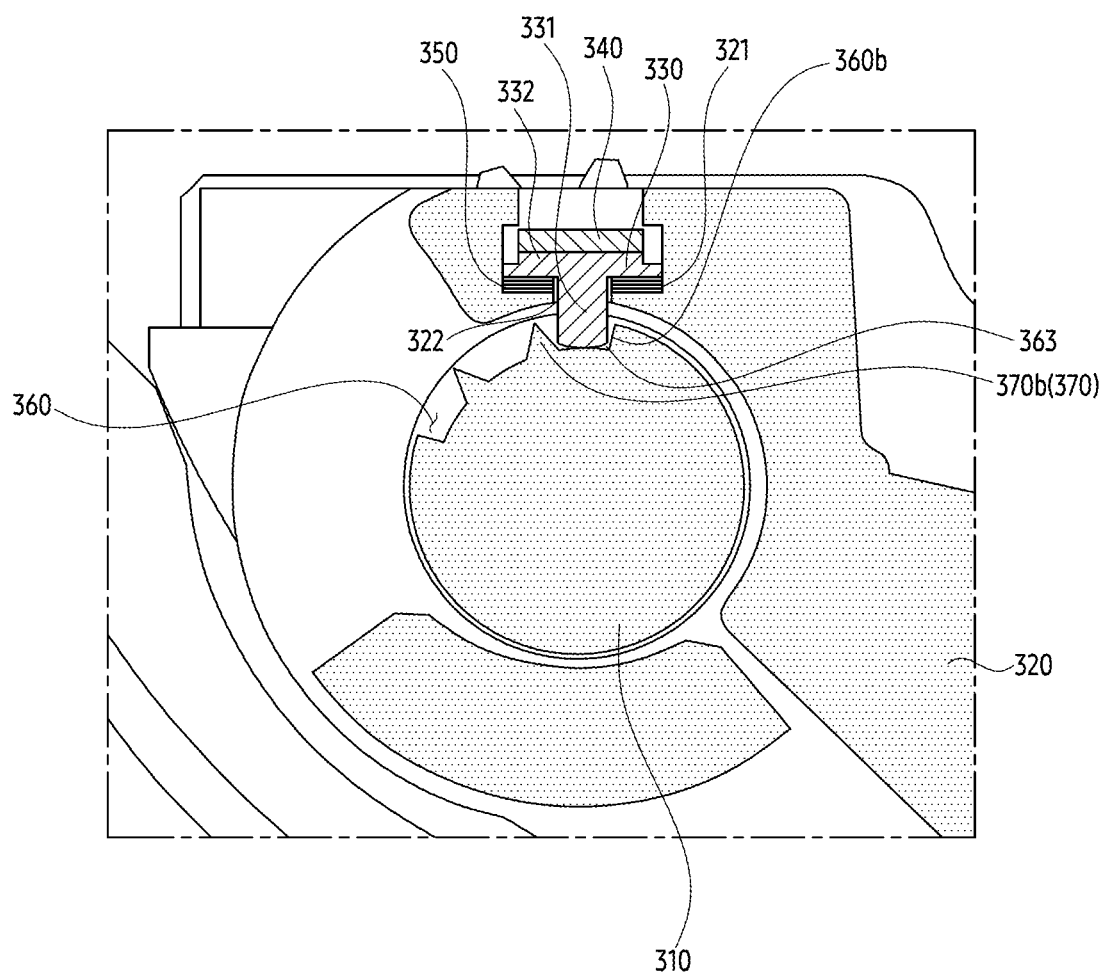
FIG. 4B illustrates an example hinge locking structure in a third state of an example electronic device according to various embodiments.

FIG. 4A illustrates an example of arrangement of a hinge locking structure in a third state of an example electronic device according to various embodiments. FIG. 4B illustrates an example hinge locking structure in a third state of an example electronic device according to various embodiments. Referring to FIG. 4A, the first hinge structure 202 may rotatably connect one side surface 221 of the second housing 220 facing the first side surface 211 of the first housing 210 and the first housing 210. The second hinge structure 203 may rotatably connect one side surface 231 of the third housing 230 facing the second side surface 212 opposite to the first side surface 211 and the first housing 210.

In the third state 200c of the electronic device 200, the first housing 210 and the second housing 220 may be folded, and the first housing 210 and the third housing 230 may be unfolded. The third state 200c may be a state in which the second housing 220 rotates with respect to the first housing 210 prior to rotation of the third housing 230 with respect to the first housing 210. Although the third housing 230 should preferentially rotate with respect to the first housing 210 during the folding operation of the electronic device 200, in the side surface where the second housing 220 preferentially rotates with respect to the first housing 210, the third state 200c may be referred to as an abnormal state. For example, in the third state 200c, an angle formed by the second housing 220 and the first housing 210 may be an angle −θ1'. The third state 200c may be a state in which the second housing 220 is further rotated by an angle θ1' in the clockwise direction after the second housing 220 rotates 180 degrees clockwise in an unfolded state. In the abnormal state of the electronic device, since the third housing 230 cannot be folded to face the first housing 210, the electronic device may be damaged when pressed to switch to the folded state. The flexible display 240 may be disposed on a curved surface or a planar surface formed by the first housing 210, the second housing 220, and the third housing 230. For example, the flexible display 240 disposed on the first housing 210 and the second housing 220 may include a planar area and a curved area. The first display area 240a disposed on the first housing 210 and the second display area 240b disposed on the second housing 220 may be a planar area. The fourth display area 240d disposed between the first display area 240a and the second display area 240b may include a curved area. The fourth display area 240d may be bent according to folding of the first housing 210 and the second housing 220 by the first hinge structure 202. The first display area 240a, the third display area 240c, and the fifth display area 240e of the flexible display 240 disposed on the first housing 210 and the third housing 230 may be substantially form a planar surface. For example, since rotation of the third housing 220 according to the second hinge structure 203 does not exist, the first housing 210 and the third housing 230 may be identical to the first state 200a.

When converted from the first state 200a (e.g., the first state 200a in FIG. 2A) to the second state 200b (e.g., the second state 200b in FIG. 2B), the third housing 230 may be folded with respect to the first housing 210, before the second housing 220 is folded with respect to the first housing 210. The abnormal state of the electronic device may be a state in which the device is folded differently from the above-described folding order. For example, in the third state 200c, the second housing 220 may be folded to the first housing 210 before the third housing 230 is folded to the first housing 210. For example, the second display area 240b disposed on the second housing 220 may face the first display area 240a disposed on the first housing 210. The first magnet 201 adjacent to another side surface 222 of the second housing 220 may face the second hinge structure 203. The first magnet 201 may interact with the magnetic body in the second hinge structure 203. Within the third state 200c in which a part of the surface of the first housing 210 contacts the second surface 220a of the second housing 220, the hinge locking structure 330 in the second hinge structure 203 may face the first magnet 201. The operation of the hinge locking structure by the interaction between the first magnet 201 and the magnetic body (e.g., the second magnet 340) in the second hinge structure 203 will be described in FIG. 4B.

Referring to FIG. 4B, the electronic device 200 may further include a hinge locking structure 330. The hinge locking structure 330 may include the pin 331. In the third state 200c, the hinge locking structure 330 may be configured to move away from the first magnet 201 by the repulsive force between the first magnet 201 and the second magnet 340 within the seating space 321, and insert the pin 331 into the groove 360. The pin 331 may be inserted into the groove 360 formed in at least one shaft 310 within the second hinge structure 203. In the third state 200c, the pin 331 may protrude to the outside of the shaft holder 320 through the opening 322 by the interaction of the first magnet 201 and the second magnet 340 (e.g., repulsive force). In the third state 200c, the polarity of the first magnet 201 may be the same as the polarity of the second magnet 340. In the third state 200c, the first magnet 201 and the second magnet 340 may provide pushing force to each other by the interaction. For example, the first magnet 201 may provide a repulsive force (pushing the second magnet 340) to the second magnet 340. The second magnet 340 may provide a repulsive force pushing the first magnet 201 to the first magnet 201. Since the first magnet 201 is fixed to the inner space close to the other side surface 222 of the second housing 220, the hinge locking structure 330 may be moved from the inside of the seating space 321 to the outside by the force transmitted to the second magnet 340. For example, the hinge locking structure 330 may move the pin 331 to the inside of the seating space 321 through the second magnet 340 attached (or connected) to the head 332 of the hinge locking structure 330. The pin 331 protruding to the outside of the shaft holder 320 may occupy at least a part of the groove 360 of the shaft 310. For example, the pin 331 may be inserted into the third space 363 located under the hinge locking structure 330 in the third state 200c. The pin 331 inserted into the third space 363 of the groove 360 may limit rotation of the third housing 230 with respect to the first housing 210. In a state in which the pin 331 is inserted into the third space 363, rotation of the shaft 310 may be limited. When the shaft 310 rotates counterclockwise, the pin 331 and the second stopper 360b may contact each other, and thus rotation may be limited. When the shaft 310 rotates clockwise, the pin 331 and the second protrusion 370b may contact each other, and thus rotation may be limited. The pin 331 may ride over the second protrusion 370b when the second protrusion 370b has an inclined surface, but may give a physical notification to the user.

While the hinge locking structure 330 is switched from the third state 200c to the first state 200a, the pin 331 may move from the groove 360 to the seating space 321 by the elastic member 350. For example, when converted to the first state 200a, the distance between the first magnet 201 and the second magnet 340 may increase. As the repulsive force applied to the second magnet 340 is weakened, the elastic force of the elastic member 350 may be greater than the repulsive force. The elastic member 350 may push up the head 332. As the head 332 moves, the pin 331 integrally formed with the head 332 may move into the seating space 321. According to the movement of the head 332, the pin 331 integrally formed with the head 332 may move into the seating space 321.

According to the above-described embodiment, in the third state 200c, the electronic device 200 may limit the movement of the third housing 230 or may provide a notification to the user when the third housing 230 moves.

Figure 5A:
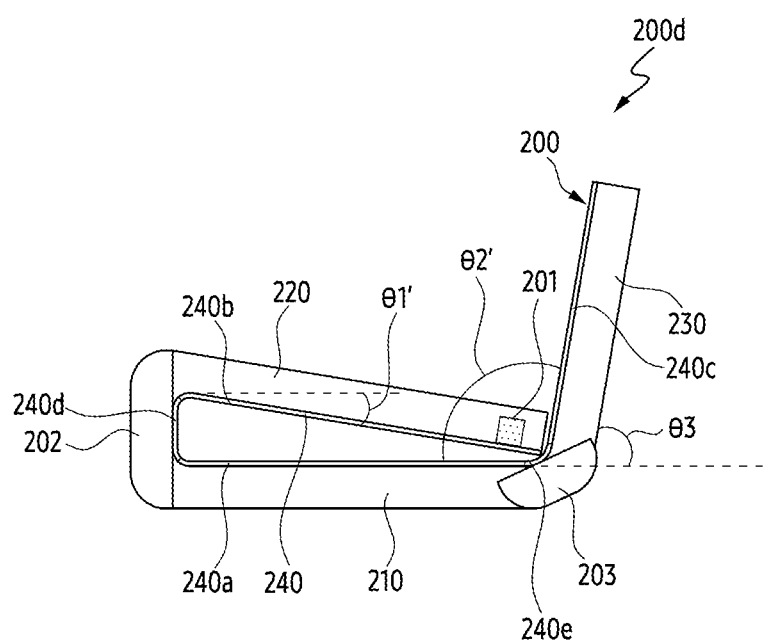
FIG. 5A illustrates an example of arrangement of a hinge locking structure when a third housing moves in a fourth state of an example electronic device according to various embodiments.
Figure 5B:
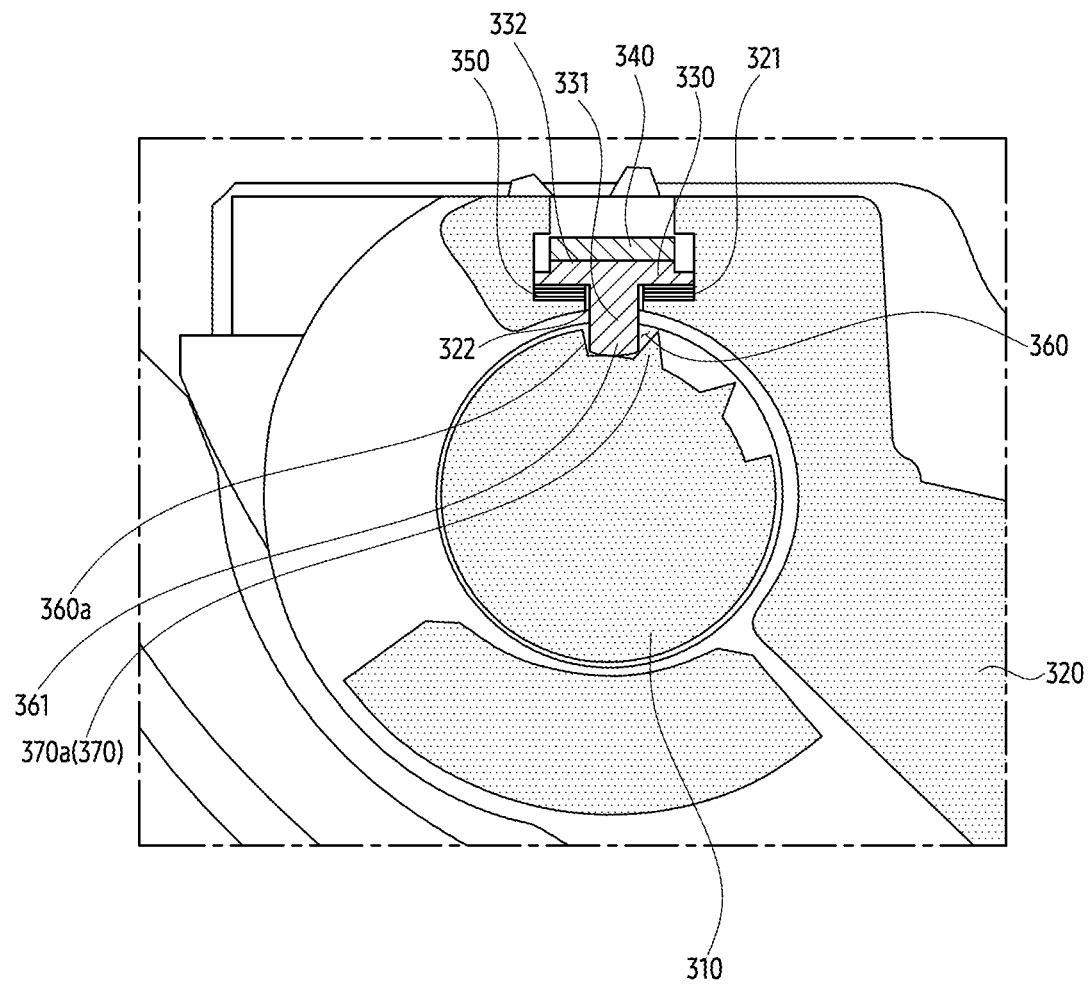
FIG. 5B illustrates an example hinge locking structure when a third housing moves in a fourth state of an example electronic device according to various embodiments.

FIG. 5A illustrates an example of arrangement of a hinge locking structure when a third housing moves in a fourth state of an example electronic device according to various embodiments. FIG. 5B illustrates an example hinge locking structure when a third housing moves in a fourth state of an example electronic device according to various embodiments.

Referring to FIG. 5A, in the third state 200c (e.g., the third state 200c of FIG. 4A) of the electronic device 200, the third housing 230 may rotate with respect to the first housing 210 through the second hinge structure 203. The fourth state 200d may be one of the abnormal states of the electronic device. For example, the abnormal state may include the third state 200c in which the second housing 220 contacts a part of the first housing 210, a state of switching from the third state 200c to the fourth state, and a fourth state 200d in which a part of the third housing 230 contacts the side surface of the second housing 220 while the second housing 220 contacts a part of the first housing 210.

Even within the fourth state 200d, positions of the first housing 210 and the second housing 220 may be the same as or similar to those of the third state 200c.

In the electronic device 200 in the fourth state 200d, the first housing 210 and the second housing 220 may be folded, and the first housing 210 and the third housing 230 may be folded. The third housing 230 may be in contact with a part of the second housing 220. The fourth state 200d may be a state in which the third housing 230 rotates counterclockwise by a third angle θ3 from the third state 200c. When the third housing 230 rotates counterclockwise further than the third angle θ3 so that the third housing 230 faces the first housing 210, the flexible display 240 or the electronic device 200 may be damaged.

In the fourth state 200d, the first display area 240a and the second display area 240b of the flexible display 240 may face each other. The second housing 220 may contact the fifth display area 240e. In the fourth state 200d, the angle of the third display area 200c with the first display area 200a may be difficult to be further reduced. For example, the third housing 230 may be movable within the designated angular range to the first housing 210, within the third state 200c among the abnormal states.

The designated angular range may be up to approximately 180 degrees from the angle θ2' between the first housing 210 and the third housing 230 in the fourth state 200d. For example, in the fourth state 200d, the angle θ2' between the first housing 210 and the third housing 230 adjacent to the second housing 220 may be related to the position where the third housing 230 can no longer rotate counterclockwise. The angle at which the third housing 230 is moveable in the abnormal state may be from an angle θ2' between the first surface 210a and the third surface 230a adjacent to the second housing 220 in the fourth state 200d in which the third surface 230a is adjacent to the second housing 220, to an angle θ2 (e.g., approximately 180 degrees) between the first surface 210a and the third surface 230a, for example, in the first state 200a or the third state 200c.

The flexible display 240 may be disposed on a curved surface or a planar surface formed by the first housing 210, the second housing 220, and the third housing 230. For example, the flexible display 240 disposed on the first housing 210 and the second housing 220 may include a planar area and a curved area. The first display area 240a disposed on the first housing 210 and the second display area 240b disposed on the second housing 210 may be planar areas. The fourth display area 240d disposed between the first display area 240a and the second display area 240b may include a curved area. The fourth display area 240d may be bent by the first hinge structure 202, according to the folding of the first housing 210 and the second housing 220. The first display area 240a, the third display area 240c, and the fifth display area 240e of the flexible display 240 disposed on the first housing 210 and the third housing 230 may include a planar area and a curved area. The first display area 240a disposed on the first housing 210 and the third display area 240c disposed on the third housing 230 may be a planar area. The fifth display area 240e disposed between the first display area 240a and the second display area 240b may include a curved area. The fifth display area 240e may be bent by the second hinge structure 203, according to the folding of the first housing 210 and the third housing 230.

The first magnet 201 may interact with a magnetic body (e.g., the second magnet 340) in the second hinge structure 203. In the third state 200c in which a part of the first surface 210 of the first housing is adjacent to the second surface 220a of the second housing (220), the hinge locking structure 330 within the second hinge structure 203 may face the first magnet 201. The operation of the hinge locking structure 330 by the interaction of the magnetic body within the first magnet 201 and the second hinge structure 203 will be described in FIG. 5B.

Referring to FIG. 5B, the hinge locking structure 330 may operate within the influence of the reactive force acting between the first magnet 201 and the second magnet 340 even while switching from the third state 200c to the fourth state 200d. In the third state 200c, when the third housing 230 moves, the pin 331 may move from one space of the accommodating spaces 361, 362, and 363 to another space in contact with the one protrusion, by moving along the surface of one of the plurality of protrusions 370. In the fourth state 200d, the pin 331 may be accommodated in the first space 361. The pin 331 may be in contact with the first stopper 360a. The hinge locking structure 330 may disengage the pin 331 of the hinge locking structure 330 from the groove 360 by the elastic member 350, by deviating from the third state 200c or the fourth state 200d, which is the abnormal state. For example, the shaft 310 from which the pin 331 is removed may be switched to a first state 200a, which is an unfolded state. The rotation of the shaft 310 in the clockwise direction may be limited by the pin 331 in contact with the first stopper 360a. In the fourth state 200d, while the second housing 220 rotates counterclockwise from the first housing 210, the repulsive force acting between the first magnet 201 and the second magnet 340 may be changed in the hinge locking structure 330. For example, the elastic member 350 may be changed based on a change in the repulsive force. The pin 331 may move from the groove 360 (e.g., the first space 361) into the seating space 321 by the elastic member 350.

According to the above-described embodiment, the hinge locking structure 330 may reduce damage to the flexible display 240 and the electronic device 200 within the fourth state 200d, by limiting the counterclockwise rotation of the third housing 230. For example, in the hinge locking structure 330, as the elastic member 350 is compressed, the pin 331 may move outside the shaft holder 320. The pin 331 moved to the outside of the shaft holder 320 may occupy one of the grooves 360 or a plurality of spaces 361, 362, and 363 in the groove 360. The hinge locking structure 330 may be configured to operate in an abnormal state (e.g., the third state 200c or the fourth state 200d) of the electronic device. The electronic device 200 may limit the rotation of the shaft 310 through the hinge locking structure 330 within the abnormal state. The electronic device 200 may prevent damage to the flexible display 240 and the electronic device 200 using the shaft 310 having limited rotation.

Figure 6:
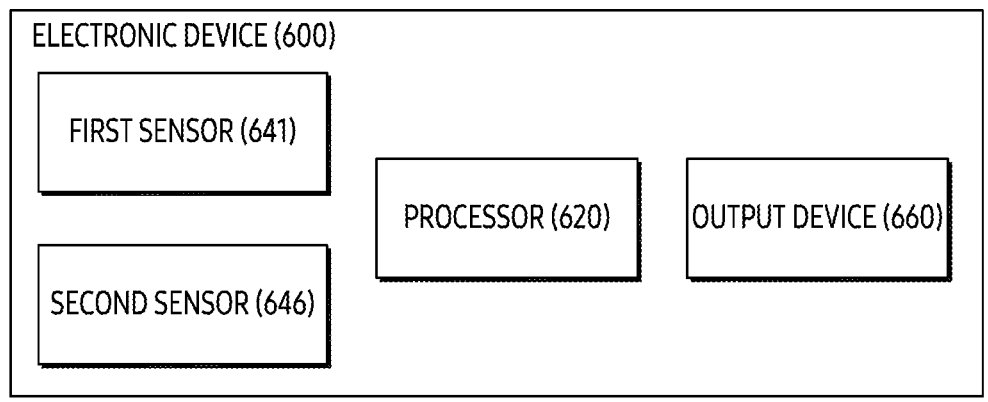
FIG. 6 is a block diagram of an example electronic device according to various embodiments.

FIG. 6 is a block diagram of an example electronic device according to various embodiments.

Referring to FIG. 6, the electronic device 600 (e.g., the electronic device 101 of FIG. 1 or the electronic device 200 of FIG. 2A) may include a processor 620 (e.g., the processor 120 of FIG. 1), sensors 641 and 646 (e.g., the sensor module 176 of FIG. 1), and an output device 660 (e.g., the sound output module 155 of FIG. 1 or the display module 160).

The electronic device 600 may control the first sensor 641, the second sensor 646, and the output device 660 through the processor 620. The processor 620 may obtain data on the state of the electronic device 600 through the first sensor 641 and the second sensor 646.

The processor 620 may be electrically connected to the first sensor 641. The processor 620 may obtain first data related to the posture of the second housing (e.g., the second housing 220 of FIG. 2A) through the first sensor 641. The first sensor 641 may be a sensor capable of obtaining sensing data related to the posture of the second housing 220. For example, the first sensor 641 may obtain data related to an angle between the first housing 210 and the second housing 220.

The processor 620 may be electrically connected to the second sensor 646. The processor 620 may obtain second data related to the posture of the third housing (e.g., the third housing 230 of FIG. 2A) through the second sensor 646. The second sensor 646 may be a sensor capable of obtaining sensing data related to the posture of the third housing 230. For example, the second sensor 646 may obtain data related to an angle between the first housing 210 and the third housing 230.

The first sensor 641 and the second sensor 646 may obtain data related to the distance, angle, posture sensed, and/or changes in magnetic field. Based on the distance, angle, posture, and/or the change in magnetic field, the processor 620 may identify an angle between the first housing 210 and the second housing 220 and/or an angle between the first housing 210 and the third housing 230. For example, the first sensor 641 may be disposed in the first housing 210 and/or the second housing 220. The first sensor 641 may include, for example, a proximity sensor, a gyro sensor, or a hall sensor. For example, when disposed in the first housing 210, the first sensor 641, which is a proximity sensor or a hall sensor, may obtain data related to a distance between the first housing 210 and the second housing 220. Although the first sensor 641 is described as being disposed in the first housing 210, the first sensor 641 may also be disposed in the second housing 220. The processor 620 may identify an angle between the first housing 210 and the second housing 220 based on the data related to the distance. For example, the first sensor 641, which is a gyro sensor or an acceleration sensor, may be disposed in the second housing 220 rotating based on the first housing 210. The first sensor 641 may identify the posture of the second housing 220. Based on the identified posture of the second housing 220, the processor 620 may identify an angle between the first housing 210 and the second housing 220.

The second sensor 646 may include, for example, a proximity sensor, a gyro sensor, or a hall sensor. For example, when disposed in the first housing 210, the second sensor 646, which is a proximity sensor or a hall sensor, may obtain data related to the distance between the first housing 210 and the third housing 230. Although the second sensor 646 is described as being disposed in the first housing 210, the second sensor 646 may also be disposed in the third housing 230. The processor 620 may identify an angle between the first housing 210 and the third housing 230 based on the data related to the distance. For example, the second sensor 646, which is a gyro sensor or an acceleration sensor, may be disposed in the third housing 230 rotating based on the first housing 210. The first sensor 641 may identify the posture of the third housing 230. Based on the identified posture of the third housing 230, the processor 620 may identify an angle between the first housing 210 and the third housing 230.

Based on the first data obtained through the first sensor 641 and the second data obtained through the second sensor 646, the processor 620 may identify the state of the first housing 220 or the third housing 230 based on the first housing 210. For example, the processor 620 may identify the first angle θ1 between the first housing 210 and the second housing 220 or the second angle θ2 between the first housing 210 and the third housing 230, based on the first data and the second data. For example, the processor 620 may identify that the electronic device 200 is in the first state 200a based on identifying that the first angle θ1 is approximately 180 degrees. The processor 620 may identify that the electronic device 200 is in the second state 200b based on identifying that the first angle θ1 is approximately 0 degrees. For example, the processor 620 may identify that the electronic device 200 is in the first state 200a based on identifying that the second angle θ2 is approximately 180 degrees. The processor 620 may identify that the electronic device 200 is in the second state 200b based on identifying that the second angle θ2 is approximately 0 degrees. According to the state change of the electronic device 200, the first angle θ1 and the second angle θ2 may change. For example, as the electronic device 200 changes from the first state 200a to the second state 200b, the first angle θ1 and the second angle θ2 may change to approximately 0 degrees from 180 degrees.

The processor 620 may be configured to provide a first notification to the outside through output device 660, based on the first angle θ1 between the first housing 210 and the second housing 220 and the second angle θ2 between the first housing 210 and the third housing 230. The output device 660 may include a display module 160 or a sound output module 155. The display module 160 may visually provide a notification based on the first angle θ1 and the second angle θ2. The sound output module 155 may audibly provide a notification based on the first angle θ1 and the second angle θ2.

The processor 620 may identify the abnormal state based on the first angle θ1 being less than the second angle θ2. The abnormal state may be a state in which the postures of the first housing 210, the second housing 220, and the third housing 230 are different from previously designated postures. The designated postures may be postures in which the second housing 220 is foldable after the third housing 230. The first hinge structure (e.g., the first hinge structure 202 of FIG. 2A) rotatably connecting the second housing 220 to the first housing 210 may have a wider width than the second hinge structure (e.g., the second hinge structure 203 of FIG. 2A) rotatably connecting the third housing 230 to the first housing 210. Due to the wide width of the first hinge structure 202, the second housing 220 may be folded after the third housing 230 and changed to the second state 200b (e.g., the second state 200b of FIG. 2B). In order to be a fully folded second state (e.g., the second state 200b of FIG. 2B), the third housing 230 may be folded on the first housing 210, and the second housing 220 may be disposed on the folded third housing 230 (e.g., the +z axis direction). In a case that the electronic device 600 cannot be in a fully folded state (e.g., the second state 200b) based on the first angle θ1 and the second angle θ2, the processor 620 may provide a first notification to the outside through the output device 660.

The processor 620 may provide another second notification distinguished from the first notification to the outside in response to identifying that the first angle θ1 is less than or equal to 0 degrees. The processor 620 may identify that the first angle θ1 is less than or equal to 0° while the first angle θ1 is less than the second angle θ2. A case in which the first angle θ1 is smaller than the second angle θ2 within the designated angular range of the first angle θ1 and the second angle θ2 may be an abnormal state of the electronic device 600. For example, in a case that the first angle θ1 is smaller than the second angle θ2 within the range of the first angle θ1 and the second angle θ2 from 0 degrees to 90 degrees, the state of the electronic device 600 may be an abnormal state. When the first angle θ1 is 0 degrees or the first angle θ1 is less than 0 degrees, the state of the electronic device 600 may be a third state 200c (e.g., the third state 200c of FIG. 4A). When the second angle θ2 between the third housing 230 and the first housing is less than the designated angle by operating the third housing 230, while a state of the electronic device 600 is the third state 200c, the flexible display (e.g., the flexible display 240 of FIG. 2A) or the electronic device 600 may be damaged. The processor 620 may provide a notification related to the possibility of damage to the flexible display 240 or the electronic device 600 to the user through the output device 660. The processor 620 may identify that the second angle θ2 between the third housing 230 and the first housing 210 is less than or equal to the designated angle. The processor 620 may be configured to provide a third notification to the outside based on the identification that the second angle θ2 is less than or equal to the designated angle.

The electronic device 600 may identify an abnormal state of the electronic device by identifying the first angle θ1 between the first housing 210 and the second housing 220 and the second angle θ2 between the first housing 210 and the third housing 230. The processor 620 may provide a different notification to the user according to the degree of the abnormal state based on the identified abnormal state. The user may stop the folding operation by recognizing the possibility of damage to the display or the electronic device through the provided notification.

Considering that the flexible display 240 is covered by the housings 210, 220, and 230 in the second state 200b, the electronic device 200 may be referred to as an in-folding electronic device. The electronic device 200 of the above-described embodiment has been described based on the in-folding electronic device, but is not limited thereto. The electronic device may be an out-folding electronic device in which the flexible display 240 is disposed on the outer surface of the electronic device and exposed in the folded state. For example, the first angle θ1 and the second angle θ2 described above may vary within a range of 180 degrees to 360 degrees. Referring back to FIG. 2A, in the unfolded state, the second housing 220 may rotate counterclockwise based on the first housing 210, and the third housing 230 may rotate clockwise based on the first housing 210.

The second housing 220 may be folded with respect to the first housing 210, based on the hinge structure or the width of the hinge cover being different, after the third housing 230 is folded with respect to the first housing 210 similar to the above-described embodiment. In order to prevent damage when the second housing 220 is preferentially folded, the third magnet (not illustrated) and the fourth magnet (not illustrated) may be disposed at the same/similar positions to the arrangement positions of the first magnet 201 and the second magnet 340.

Figure 7:
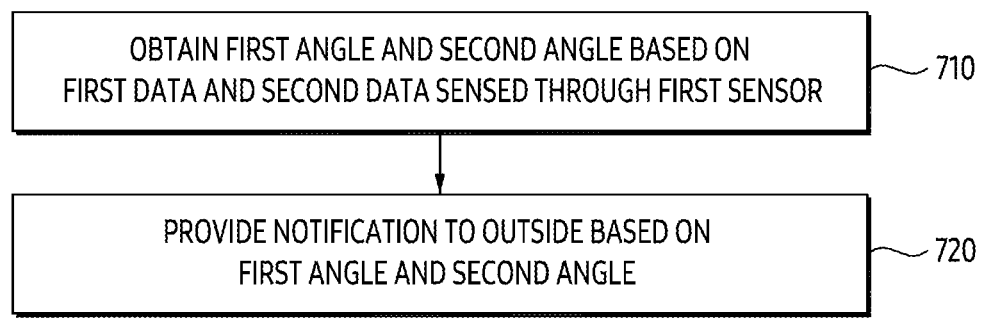
FIG. 7 is a flowchart illustrating an example operation of detecting an abnormal state of an example electronic device according to various embodiments.

FIG. 7 is a flowchart illustrating an example operation of detecting an abnormal state of an electronic device according to various embodiments.

Referring to FIG. 7, in operation 710, the processor 620 (e.g., the processor 620 of FIG. 6) may obtain the first angle θ1 and the second angle θ2 based on the first data and the second data sensed through the first sensor (e.g., the first sensor 641 in FIG. 6) and the second sensor (e.g., the second sensor 646 in FIG. 6). The first data may be a distance or an angle between the first housing 210 and the second housing 220 obtained through the first sensor 641. The second data may be a distance or an angle between the first housing 210 and the third housing 230 obtained through the second sensor 646.

In operation 720, the processor 620 may provide a notification to the outside based on the first angle θ1 and the second angle θ2. The processor 620 may identify the state of the electronic device based on the first angle θ1 and the second angle θ2. The processor 620 may provide various notifications to the outside based on the state of the electronic device. For example, in response to identifying that the state of the electronic device is the abnormal state, a first notification related to the abnormal state of the electronic device may be provided externally. For example, in a case that the state of the electronic device is identified as the third state (e.g., the third state 200c of FIG. 4A), the processor 620 may provide a second notification to warn that the display or electronic device may be damaged when the third housing is moved more than the designated angle. For example, in a case that the state of the electronic device is identified as the fourth state (e.g., the fourth state 200d of FIG. 4A), the processor 620 may provide a third notification to warn that the display or electronic device may be damaged when the third housing is further moved.

In FIGS. 6 and 7, the electronic device may be configured to prevent damage to the electronic device or the display by notifying the abnormal state of the electronic device by identifying the first angle θ1 and the second angle θ2. The electronic device may physically limit the movement of the third housing 230 in the abnormal state (e.g., the third state 200c or the fourth state 200d) by having a hinge structure including the hinge locking structure 330 of FIGS. 3A to 5B.

According to the above-described example embodiments, the electronic device may reduce the possibility of damage to the electronic device due to movement of the third housing, by providing a locking structure that physically limits the movement of the third housing when the abnormal state is reached. The electronic device may notify the wrong (potentially damaging) movement of the third housing, by alerting the user by providing a step-by-step notification of abnormal state.

According to the above-described example embodiments, an electronic device (e.g., the electronic device 101 of FIG. 1 or the electronic device 200 of FIG. 2A) may include a first housing (e.g., the first housing 210 of FIG. 2A) including a first surface (e.g., the first surface 210a of FIG. 2A), a second housing (e.g., the second housing 220 of FIG. 2A) including a second surface (e.g., the second surface 220a of FIG. 2A), and a third housing (e.g., the third housing 230 of FIG. 2A) including a third surface (e.g., the third surface 230a of FIG. 2A).

According to an example embodiment, the electronic device may include a first hinge structure (e.g., the first hinge structure 202 of FIG. 2A) and a second hinge structure (e.g., the second hinge structure 260 of FIG. 2A). The first hinge structure may rotatably connect one side surface (e.g., one side surface 221 of FIG. 3A) of the second housing facing a first side surface (e.g., the first side surface 211 of FIG. 3A) of the first housing to the first housing. The second hinge structure may rotatably connect one side surface (e.g., one side surface 231 of FIG. 3A) of the third housing facing a second side surface (e.g., the second side surface 212 of FIG. 3A) of the first housing opposite to the first side surface to the first housing. The electronic device may further include a flexible display (e.g., the flexible display 240 of FIG. 2A). The flexible display may be disposed on a surface formed by the first housing, the second housing, and the third housing. According to an example embodiment, the electronic device may further include a first magnet (e.g., the first magnet 201 of FIG. 3A). The first magnet may be disposed in the second housing. According to an example embodiment, the electronic device may further include a hinge locking structure (e.g., the hinge locking structure 330 of FIG. 3B). The hinge locking structure may include a pin (e.g., the pin 331 of FIG. 3B) facing the first magnet and insertable into a groove formed in at least one shaft in the second hinge structure (e.g., the groove 360 of FIG. 3B), in an abnormal state of the electronic device in which a part of the first surface is adjacent to the second surface.

According to an example embodiment, the first hinge structure and the second hinge structure may switch the electronic device into an unfolded state in which the first surface, the second surface, and the third surface face the same direction, or a folded state in which at least one of the first surface, the second surface, and the third surface face different directions.

According to an example embodiment, the pin may be spaced apart (or disengaged) from the groove in the hinge locking structure as the abnormal state is changed to the unfolded state.

According to an example embodiment, the first magnet may be disposed in a periphery portion (e.g., the periphery portion 229 of FIG. 3A) of the second housing including the other side surface of the second housing facing the one side surface of the second housing.

According to an example embodiment, the hinge locking structure may include a second magnet (e.g., the second magnet 340 of FIG. 3B). The second magnet may be disposed on a surface of the hinge structure facing the flexible display.

According to an example embodiment, the polarity of the first magnet may be the same as that of the second magnet.

According to an example embodiment, in the abnormal state of the electronic device, the hinge locking structure may be configured to insert the pin into the groove by moving from the first magnet within the seating space by the repulsive force between the first magnet and the second magnet.

According to an example embodiment, the second hinge structure may further include a shaft holder (e.g., the shaft holder 320 of FIG. 3B). The shaft holder 320 may rotatably support the at least one shaft.

According to an example embodiment, the shaft holder may include a seating space in which the hinge locking structure is seated. The shaft holder may include an elastic member (e.g., the elastic member 350 of FIG. 3B). The elastic member may elastically support the hinge locking structure within the seating space.

According to an example embodiment, while the electronic device is changed to the unfolded state from the abnormal state, the pin may be moved from the groove to the seating space by the elastic member.

According to an example embodiment, the at least one shaft may rotate as the electronic device changes to a folded state or an unfolded state, and may be configured to rotate the third housing with respect to the first housing.

According to an example embodiment, the groove may include a plurality of protrusions (e.g., the plurality of protrusions 370 of FIG. 3B) protruding in a radial direction of the shaft and spaced apart by a designated interval in the groove.

According to an example embodiment, the designated interval may correspond to the width (or other dimension) of the pin.

According to an example embodiment, the plurality of protrusions may provide a plurality of accommodating spaces into which the pin is insertable.

According to an example embodiment, a side surface of the groove may be parallel to the radial direction of the shaft.

According to an example embodiment, the side surface of the plurality of protrusions may have an inclination relative to a radial direction of the shaft.

According to an example embodiment, when the third housing moves within the abnormal state of the electronic device, the pin may move from one space (e.g., a third space 363) of the accommodating spaces (e.g., the first space 361, the second space 362, and the third space 363) to another space (e.g., a second space 362) contacting the one protrusion by moving along the surface of one of the plurality of protrusions.

According to an example embodiment, the third housing may be movable within a designated angular range in the abnormal state of the electronic device with respect to the first housing.

According to an example embodiment, the designated angular range may be 180 degrees from an angle between the first surface contacting the second housing in the abnormal state and the third surface contacting the side surface of the second housing.

According to an example embodiment, in the unfolded state, an overlapped area of the display and the first hinge structure when the first hinge structure is viewed from above may be wider than an overlapped area of the display and the second hinge structure when the second hinge structure is viewed from above. For example, the width of the first hinge cover may be wider than the width of the second hinge cover.

According to an example embodiment, the electronic device may include a processor (e.g., the processor 120 of FIG. 1 or the processor 620 of FIG. 6), a first sensor (e.g., the first sensor 641 of FIG. 6), and a second sensor (e.g., the second sensor 646 of FIG. 6).

According to an example embodiment, the first sensor may obtain first data related to the posture of the second housing and may be disposed in the second housing.

According to an example embodiment, the second sensor may obtain second data related to the posture of the third housing and may be disposed in the third housing.

According to an example embodiment, the processor may obtain a positional relationship of the second housing or the third housing based on the first housing based on the first data and the second data sensed through the first sensor. The positional relationship may be expressed by an angle.

According to an example embodiment, the processor may be configured to provide a notification to the outside, in response to identifying that the first angle θ1 between the first housing and the second housing is less than the second angle θ2 between the first housing and the third housing.

According to an example embodiment, the processor may be configured to provide another notification distinguished from the notification to the outside in response to identifying that the first angle θ1 is 0 degrees.

According to an example embodiment, the pin inserted into the groove may limit rotation of the third housing with respect to the first housing.

According to an example embodiment, the electronic device (e.g., the electronic device 101 of FIG. 1 or the electronic device 200 of FIG. 2A) may include a first housing (e.g., the first housing 210 of FIG. 2A) including a first surface (e.g., the first surface 210a of FIG. 2A), a second housing (e.g., the second housing 220 of FIG. 2A) including a second surface (e.g., the second surface 220a of FIG. 2A), and a third housing (e.g., the third housing 230 of FIG. 2A) including a third surface (e.g., the third surface 230a of FIG. 2A).

According to an example embodiment, the electronic device may include a first hinge structure (e.g., the first hinge structure 202 of FIG. 2A) and a second hinge structure (e.g., the second hinge structure 203 of FIG. 2A). The first hinge structure may rotatably connect one side surface (e.g., one side surface 221 of FIG. 3A) of the second housing facing a first side surface (e.g., the first side surface 211 of FIG. 3A) of the first housing to the first housing. The second hinge structure may rotatably connect one side surface (e.g., the side surface 231 of FIG. 3A) of the third housing facing a second side surface (e.g., the second side surface 212 of FIG. 3A) of the first housing opposite to the first side surface.

The example electronic device may further include a flexible display (e.g., the flexible display 240 of FIG. 2A). The flexible display may be disposed on a surface formed by the first housing, the second housing, and the third housing.

According to an example embodiment, the electronic device may include a processor (e.g., the processor 120 of FIG. 1 or the processor 620 of FIG. 6), a first sensor (e.g., the first sensor 641 of FIG. 6), and a second sensor (e.g., the second sensor 646 of FIG. 6). According to an example embodiment, the first sensor may obtain first data related to the posture of the second housing and may be disposed in the second housing. According to an example embodiment, the second sensor may obtain second data related to the posture of the third housing and may be disposed in the third housing.

According to an example embodiment, the electronic device may include a first magnet within the second housing.

According to an example embodiment, the electronic device may include a hinge locking structure (e.g., the hinge locking structure 330 of FIG. 3B). The hinge locking structure may include a pin (e.g., the pin 331 of FIG. 3B) facing the first magnet and insertable into a groove formed in at least one shaft in the second hinge structure, in abnormal state of the electronic device in which a part of the first surface is adjacent to the second surface.

According to an example embodiment, the first hinge structure and the second hinge structure may be configured to provide an unfolded state in which the first surface, the second surface, and the third surface face the same direction, or a folded state in which at least one of the first surface, the second surface, or the third surface face different directions.

According to an example embodiment, an overlapped area between the display and the first hinge structure when the display is viewed from above in the unfolded state may be larger than an overlapped area between the display and the second hinge structure.

According to an example embodiment, the electronic device may further include a processor (e.g., the processor 620 of FIG. 6).

According to an example embodiment, the processor may obtain the angle of the second housing or the third housing based on the first housing based on the first data and the second data obtained through the first sensor, and provide a first notification to the outside in response to identifying that the first angle θ1 between the first housing and the second housing is smaller than the second angle θ2 between the first housing and the third housing.

According to an example embodiment, the processor may be configured to provide a second notification distinguished from the first notification to the outside in response to identifying that the first angle θ1 is 0 degrees.

According to an embodiment, the processor may be configured to identify that the second angle θ2 is less than or equal to the designated angle and provide a third notification to the outside based on an identification that the second angle θ2 is below the designated angle.

An example electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing including a first surface;
a second housing including a second surface;
a third housing including a third surface;
a first hinge rotatably connecting the first housing and a first side surface of the second housing facing a first side surface of the first housing;
a second hinge rotatably connecting the first housing and a side surface of the third housing facing a second side surface of the first housing opposite to the first side surface of the first housing;
a flexible display disposed on the first surface, the second surface and the third surface;
a first magnet disposed in the second housing; and
a hinge lock which, in an abnormal state of the electronic device in which a portion of the first surface is adjacent to the second surface, faces the first magnet and which includes a pin insertable into a groove formed in at least one shaft in the second hinge,
wherein the first hinge and the second hinge are configured to provide an unfolded state in which the first surface, the second surface, and the third surface face the same direction or a folded state in which at least one of the first surface, the second surface, or the third surface face different directions, and
wherein the hinge lock is configured such that the pin is inserted into the groove by a force of the first magnet in the abnormal state of the electronic device, and the pin is disengaged from the groove as the electronic device changes from the abnormal state to the unfolded state.

2. The electronic device according to claim 1, wherein the first magnet is disposed at a peripheral portion of the second housing including a second side surface of the second housing facing the first side surface of the second housing,
wherein the hinge lock includes a second magnet facing the flexible display, and
wherein a polarity of the first magnet is same a polarity of the second magnet.

3. The electronic device according to claim 2, wherein, in the abnormal state of the electronic device, the pin of the hinge lock is configured to move away from the first magnet into the groove due to a repulsive force between the first magnet and the second magnet.

4. The electronic device according to claim 1, wherein the second hinge includes a shaft holder rotatably supporting the at least one shaft,
wherein the shaft holder includes a seating space in which the hinge lock is seated and an elastic member for elastically supporting the hinge lock in the seating space.

5. The electronic device according to claim 4, wherein the elastic member is configured to provide a restoring force to the pin for moving the pin from the groove into the seating space, when the electronic device changes to the unfolded state from the abnormal state.

6. The electronic device according to claim 1, wherein the at least one shaft rotates based on change of the electronic device to the folded state or the unfolded state.

7. The electronic device according to claim 1, wherein the groove includes a plurality of protrusions protruding in a radial direction of the shaft within the groove and spaced apart at designated interval.

8. The electronic device according to claim 7, wherein the designated interval corresponds to a dimension of the pin.

9. The electronic device according to claim 7, wherein the plurality of the protrusions provides a plurality of accommodating spaces into which the pin is insertable,
wherein a side of the groove is parallel to the radial direction of the shaft, and
wherein a side surfaces of the plurality of protrusions are inclined with respect to the radial direction of the shaft.

10. The electronic device according to claim 7,
when the third housing is moved in the abnormal state of the electronic device, the pin moves from a first one of the accommodating spaces to another different one of the accommodating spaces.

11. The electronic device according to claim 1, wherein the third housing is movable within a designated angular range with respect to the first housing in the abnormal state of the electronic device.

12. The electronic device according to claim 11, wherein the designated angular range is from the angle between the first surface in contact with the second housing and the third surface in contact with the side surface of the second housing to 180 degrees.

13. The electronic device according to claim 1, in the unfolded state of the electronic device, an overlapped area of the flexible display and the first hinge structure when the first hinge structure is viewed from above is wider than an overlapped area of the flexible display and the second hinge structure when the second hinge structure is viewed from above.

14. The electronic device according to claim 1, further comprising:
a first sensor disposed in the second housing and configured to obtain first data related to a posture of the second housing;
a second sensor disposed in the third housing and configured to obtain second data related to a posture of the third housing; and
a processor; and
wherein the processor is configured to:
obtain a first angle between the first housing and the second housing and a second angle between the first housing and the third housing based on the first data and the second data, and
provide a first notification, in response to identifying that the first angle is smaller than the second angle.

15. The electronic device according to claim 14, wherein the processor is configured to provide a second notification in response to identifying that the first angle is 0 degrees.

16. The electronic device according to claim 1, wherein the pin inserted into the groove limits rotation of the third housing relative to the first housing.

17. An electronic device comprising:
a first housing including a first surface;
a second housing including a second surface;
a third housing including a third surface;
a first hinge rotatably connecting the first housing and a first side surface of the second housing facing a first side surface of the first housing;
a second hinge rotatably connecting the first housing and a side surface of the third housing facing a second side surface of the first housing opposite to the first side surface of the first housing;
a flexible display disposed on the first surface, the second surface and the third surface;
a first sensor disposed in the second housing and configured to obtain first data related to a posture of the second housing;
a second sensor disposed in the third housing and configured to obtain second data related to a posture of the third housing;
a first magnet disposed in the second housing;
a hinge lock which, in an abnormal state of the electronic device in which a portion of the first surface is adjacent to the second surface, faces the first magnet and which includes a pin insertable into a groove formed in at least one shaft in the second hinge,
wherein the first hinge structure and the second hinge structure are configured to provide an unfolded state in which the first surface, the second surface, and the third surface face the same direction or a folded state in which at least one of the first surface, the second surface, or the third surface face different directions, and
in the unfolded state, when the flexible display is viewed from above, an overlapped area of the flexible display and the first hinge structure is wider than an overlapped area of the flexible display and the second hinge structure.

18. The electronic device according to claim 17, further comprising:
a processor,
wherein the processor is configured to:
obtain a first angle between the first housing and the second housing and a second angle between the first housing and the third housing based on the first data and the second data, and
provide a first notification, in response to identifying that the first angle is smaller than the second angle.

19. The electronic device according to claim 18, wherein the processor is configured to provide a second notification different from the first notification, in response to identifying that the first angle is 0 degrees.

20. The electronic device according to claim 19, wherein the processor is configured to:
identify that the second angle is less than or equal to a specified angle, and
provide a third notification to the outside based on the identification of the second angle being less than or equal to the specified angle.

* * * * *